United States Patent
Ohira et al.

(10) Patent No.: US 7,326,368 B2
(45) Date of Patent: Feb. 5, 2008

(54) FLUID IN LIQUID STATE CONTAINING DISPERSED NANO-PARTICLES OF METAL OR THE LIKE

(75) Inventors: Hiroaki Ohira, Higashi-Ibaraki-gun (JP); Kuniaki Ara, Higashi-Ibaraki-gun (JP); Mamoru Konomura, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 142 days.

(21) Appl. No.: 11/104,406

(22) Filed: Apr. 13, 2005

(65) Prior Publication Data

US 2006/0054869 A1 Mar. 16, 2006

Related U.S. Application Data

(62) Division of application No. 10/894,129, filed on Jul. 20, 2004, now abandoned.

(30) Foreign Application Priority Data

Aug. 12, 2003 (JP) .............................. 2003-291967

(51) Int. Cl.
*H01B 1/02* (2006.01)
*H01B 1/08* (2006.01)
*C09K 5/00* (2006.01)

(52) U.S. Cl. ...................... 252/512; 252/518.1; 252/71
(58) Field of Classification Search .................. 252/71, 252/512, 518.1
See application file for complete search history.

(56) References Cited

U.S. PATENT DOCUMENTS

| 3,726,642 A | 4/1973 | Isaacs et al. |
| 3,935,063 A * | 1/1976 | Dunckel ...................... 376/282 |
| 4,911,232 A | 3/1990 | Colvin et al. |
| 5,641,424 A * | 6/1997 | Ziolo et al. .................... 252/67 |
| 6,221,275 B1 | 4/2001 | Choi et al. |

(Continued)

FOREIGN PATENT DOCUMENTS

| DE | 41 31 516 A1 | 4/1993 |
| DE | 100 65 671 A | 7/2002 |
| GB | 855859 | 12/1960 |
| WO | WO 02/96835 A2 * | 5/2002 |

OTHER PUBLICATIONS

Saito et al., "Study on control of chemical activity of sodium in nuclear reactor cooling system," *Genshiryoku Eye*, 51(9), pp. 66-69 (2005).*

J. Eastman et al., "Anomalously increased effective thermal conductivities of ethylene glycol-based nanofluids containing copper nanoparticles" *Applied Physics Letters*, vol. 78, No. 6, pp. 718-720 (Feb. 5, 2001).

S. Lee et al., "Measuring Thermal Conductivity of Fluids Containing Oxide Nanoparticles" *American Society of Mechanical Engineers*, vol. 121, pp. 280-289 (May 1999).

(Continued)

*Primary Examiner*—Mark Kopec
*Assistant Examiner*—Jaison Thomas
(74) *Attorney, Agent, or Firm*—Wenderoth, Lind & Ponack, L.L.P.

(57) ABSTRACT

Nano-particles 1 of a metal or the like are dispersed in a liquid fluid 2. Thereby, the reactivity or toxicity of the liquid fluid can be reduced when the liquid fluid has reactivity or toxicity. The flow resistance of the liquid fluid can be raised, and the leakage of the liquid fluid from minute cracks can be reduced. By using the liquid fluid as a heat transfer medium of a heat exchanger, the heat transfer performance equivalent to or higher than the heat transfer performance of the original heat exchanger can be obtained.

8 Claims, 2 Drawing Sheets

U.S. PATENT DOCUMENTS

| | | |
|---|---|---|
| 6,329,058 B1 | 12/2001 | Arney et al. |
| 6,432,320 B1 * | 8/2002 | Bonsignore et al. .......... 252/70 |
| 6,945,658 B2 * | 9/2005 | Borra et al. ................ 359/846 |
| 7,104,313 B2 * | 9/2006 | Pokharna et al. .......... 165/80.4 |
| 2005/0269548 A1 * | 12/2005 | Jeffcoate et al. .............. 252/71 |

OTHER PUBLICATIONS

Y. Xuan et al., "Heat transfer enhancement of nanofluids" *International Journal of Heat and Fluid Flow*, vol. 21, No. 1, pp. 58-64 (Sep. 1, 1999).

* cited by examiner

FLUID IN LIQUID STATE CONTAINING DISPERSED NANO-PARTICLES OF METAL OR THE LIKE

This is a divisional of Ser. No. 10/894,129 filed Jul. 20, 2004, now abandoned.

BACKGROUND OF THE INVENTION

1. Field of the Invention

The present invention relates to a technique for reducing the reactivity or toxicity of a fluid in a liquid state (hereinafter referred to as "liquid fluid"), or for improving the flow resistance or thermal conductivity thereof.

2. Description of the Related Art

Although a conventional coolant for a fast reactor is advantageous in that a high-density thermal energy generated in a reactor core can be transferred using a liquid metal such as sodium, there is disadvantage that the possibility of violent reactions such as sodium-water reaction that occurs in a heat exchanger such as a steam generator, and the combustion of sodium when sodium leaks, cannot be completely eliminated.

In addition, in a heat exchanger included in plants or the like wherein contact of a high-temperature heat transfer medium with a low-temperature heat transfer medium is not allowed, or in equipment and systems using a liquid fluid that has a high reactivity or toxicity, there is a disadvantage that the accidental leakage of a liquid fluid cannot be completely eliminated.

Therefore, an object of the present invention is to reduce the reactivity or toxicity of a liquid fluid used as a liquid metal coolant or a heat transfer medium for a heat exchanger even in case the liquid fluid leaks; and to raise the flow resistance of the liquid fluid to reduce the leakage thereof as much as possible.

SUMMARY OF THE INVENTION

The inventors have accomplished the present invention on the basis of the findings that the dispersion of nano-size ultra-fine particles (about 1 to 100 nanometers in diameter) (referred to as "nano-particles" in the present specification) such as metals, alloys or metallic compounds in a liquid fluid such as a liquid metal coolant or a heat transfer medium for a heat exchanger can reduce the reactivity or toxicity thereof, and can improve the flow resistance or thermal conductivity thereof.

Specifically, the present invention is a fluid in a liquid state wherein one or more kinds of nano-particles selected from a group consisting of metals, alloys and metallic compounds are dispersed in a fluid in a liquid state.

An embodiment of the present invention is a fluid in a liquid state wherein the reactivity or toxicity thereof is reduced by dispersing one or more kinds of nano-particles selected from a group consisting of metals, alloys and metallic compounds in a fluid in a liquid state having reactivity or toxicity.

Another embodiment of the present invention is a fluid in a liquid state wherein the flow resistance thereof is enhanced by dispersing one or more kinds of nano-particles selected from a group consisting of metals, alloys and metallic compounds in a fluid in a liquid state.

Still another embodiment of the present invention is a fluid in a liquid state as a heat transfer medium for a heat exchanger wherein the thermal conductivity of the heat transfer medium is raised by dispersing in the fluid in a liquid state one or more kinds of nano-particles selected from a group consisting of metals, alloys and metallic compounds having a higher thermal conductivity than the fluid in a liquid state.

According to a liquid fluid of the present invention containing dispersed nano-particles of a metal or the like, the following effect can be obtained:

(1) Even if the leakage of the liquid fluid in the same volume as in the conventional liquid fluid occurs, the volume of the liquid fluid itself is reduced by the volume occupied by the nano-particles, and the reactivity or toxicity of the liquid fluid can be reduced. Furthermore, the adsorption of the liquid fluid around and in the nano-particles contained and dispersed in the liquid fluid can be considered, with the result that the appearance of the reactivity or toxicity of the liquid fluid is further retarded.

(2) The dispersion of a high concentration of nano-particles can raise the flow resistance of the liquid fluid, resulting in the reduction of the leakage quantity when a minute crack or the like is produced.

(3) The use of a liquid fluid containing dispersed metallic nano-particles having a thermal conductivity suitable for a heat transfer medium in a heat exchanger can provide the heat transfer performance of the heat exchanger equivalent to or higher than the performance of a heat transfer medium containing no nano-particles.

BRIEF DESCRIPTION OF THE DRAWINGS

FIG. 1 is a conceptual diagram of a liquid fluid of the present invention containing dispersed nano-particles of a metal or the like.

DETAILED DESCRIPTION OF THE PREFERRED EMBODIMENTS

Figure 1:
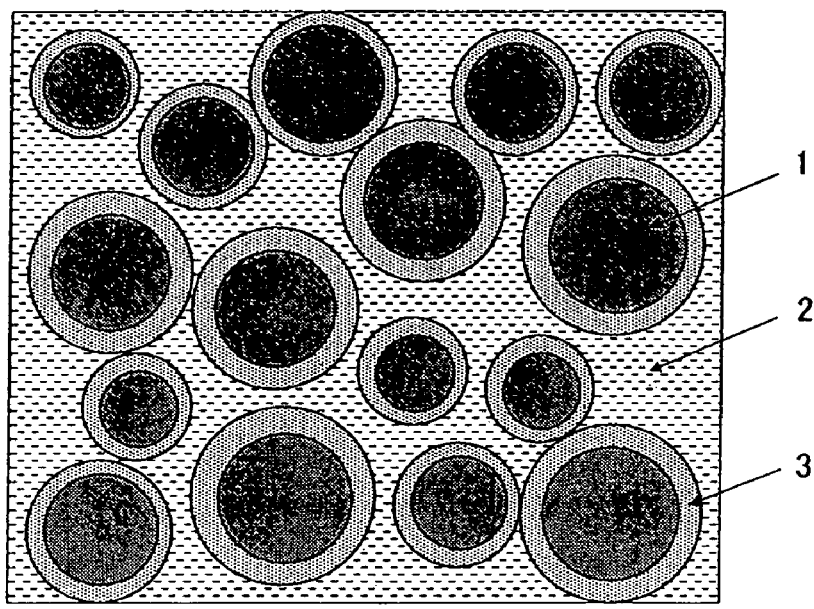

As shown in FIG. 1, the liquid fluid according to the present invention is a fluid in a slurry state prepared by dispersing nano-particles 1 consisting of a metal, an alloy or a metallic compound (hereinafter collectively referred to as "metal or the like") in a conventionally used liquid fluid 2 having reactivity or toxicity.

A liquid metal, such as liquid sodium, used as a coolant in a fast reactor transfers heat energy to water or water vapor through a heat transfer tube in a steam generator. If the heat transfer tube is cracked due to corrosion or the like, the liquid sodium leaking through the crack is contacted with water and steam and causes a violent reaction to occur. If the liquid sodium leaks in an air atmosphere, it reacts with oxygen or water vapor in the air to cause sodium combustion. However, when nano-particles of a metal or the like inactive to sodium, water and oxygen are contained and dispersed in the liquid sodium, the leakage quantity of sodium itself is reduced by the volume occupied by the nano-particles even if the leakage of the liquid fluid in the same volume as in the conventional fluid happens, and therefore the quantity of sodium that reacts with water or water vapor, or burns due to the presence of oxygen decreases, resulting in the reduction of the sodium-water reaction or sodium combustion by the reduced quantity of sodium.

The effect of reducing the reactivity of liquid sodium obtained by dispersing nano-particles of a metal or the like can be obtained also in general heat transfer media whose contact is not allowed in a heat exchanger wherein a high-temperature heat transfer medium and a low-temperature heat transfer medium exchange heat through a heat transfer tube, and furthermore, the effect is equally obtained for general liquid fluids having violent reactivity.

For the same reason as the reactivity reducing effect, the toxicity of the liquid fluid can also be reduced by dispersing nano-particles of a metal or the like in the liquid fluid having toxicity.

Examples of nano-particles used in the present invention include pure metals such as copper (Cu), nickel (Ni), titanium (Ti), cobalt (Co) and the like; metallic compounds such as the oxides, nitrides, silicides thereof; and alloys such as stainless steels, chromium-molybdenum steels and the like. Among these substances, an adequate substance can be selected depending on the type of the liquid fluid and the effect to be obtained. The nano-particles of one kind may be contained in the liquid fluid, or may be contained in combination of two or more kinds as required. Commercially available nano-particles include, for example, "Nickel Fine-Powder", "Copper Fine-Powder" and "Cobalt Fine-Powder" manufactured by Sumitomo Electric Industries, Ltd.; and "Ni Metallic Nano-Powder", "Cu Metallic Nano-Powder", and "Co Metallic Nano-Powder" manufactured by Japan Nanotech Co., Ltd.

When nano-particles of a metal or the like are mixed and dispersed in the liquid fluid, the following methods can be adopted:

(1) In the case of a general liquid such as water, the nano-particles are mixed and dispersed in the liquid.
(2) In the case of a liquid metal, the nano-particles are mixed and dispersed in the liquid metal after removing an oxide layer or a hydroxide layer on the surfaces of the nano-particles by a hydrogen reduction method or the like.
(3) In the case of a liquid alkali metal such as liquid sodium, the nano-particles are mixed into hot liquid sodium of a temperature of several hundreds of degrees Celsius to thereby effectively remove an oxide layer on the surfaces of the nano-particles and stably disperse the nano-particles in the liquid sodium.

In general, when a liquid fluid comes into contact with a metal or the like, there is seen a phenomenon wherein the molecules or atoms of the liquid fluid are adsorbed on the surface of the metal or the like by chemical reaction. However, since the contact area is small when a container or duct made of a metal or the like is filled with the liquid fluid, the bulk characteristics of the liquid fluid are dominant, and the effect of adsorption at the boundary does not significantly appear. Whereas, when nano-particles of a metal or the like are dispersed in a liquid fluid, the contact area of the nano-particles and the liquid fluid is enlarged, and the adsorption phenomenon of the molecules or atoms of the liquid fluid onto the nano-particles appears significantly. For example, when liquid sodium is sealed in a cubic Ni container having a side of 1 m, the contact area between the liquid sodium and the wall of the container is only 6 $m^2$; however, when Ni nano-particles of a diameter of 10 nm are dispersed in the liquid sodium in an amount of 20% by weight, the contact area becomes about $1.6 \times 10^7$ $m^2$, bringing in about 2.7 million times as large contact area as that of the cubic container. With such increase in the contact area, the number of liquid sodium atoms adsorbed on the surface of or in the nano-particles also increases.

In FIG. 1, there is conceptually illustrated the phenomenon wherein a liquid fluid 3, such as liquid sodium, is adsorbed around nano-particles 1, such as a metal or the like. Therefore, for example, when liquid sodium containing dispersed nano-particles comes in contact with water, the quantity of liquid sodium 3 adsorbed around the nano-particles 1 and being difficult to react with water increases, and on the other hand, the quantity of liquid sodium 2 causing a first-order reaction with water can be decreased. As a result, the appearance of the reactivity or toxicity of the liquid fluid can be retarded as compared to the case wherein nano-particles are simply dispersed in the liquid fluid.

According to the present invention, the dispersion of nano-particles of a metal or the like in a liquid fluid can also raise the viscosity of the liquid fluid, resulting in the rise of the flow resistance of the fluid. Therefore, for example, even when a minute crack or the like is produced in a structural material such as a heat transfer tube, and a liquid fluid leaks through the crack, it can be expected that the quantity of leakage can be minimized because of the raised flow resistance of the liquid fluid.

When the liquid fluid containing dispersed nano-particles according to the present invention is used as the heat transfer medium of a heat exchanger, a predetermined heat-exchanging performance must be secured without lowering the thermal conductivity of the heat transfer medium. In a liquid fluid having a relatively low thermal conductivity, such as water, the thermal conductivity can be raised by dispersing nano-particles of a metal such as Ni, Cu, Co or the like, a compound thereof, or an alloy such as stainless steels, chromium-molybdenum steels or the like having a thermal conductivity higher than the thermal conductivity of water, and thus the heat transfer properties of the heat exchanger can be improved. In the case of a liquid fluid having a relatively high thermal conductivity, such as liquid sodium or other liquid metals, the thermal conductivity equivalent to the thermal conductivity of the liquid metal can be secured without lowering the thermal conductivity of the liquid metal, by dispersing nano-particles having a thermal conductivity equal to or higher than the thermal conductivity of the liquid metal, for example, the nano-particles of Cu, Ni, Co or the like. Therefore, when the liquid fluid containing dispersed nano-particles according to the present invention is used as the heat transfer medium for a heat exchanger, the heat transfer properties of the heat exchanger can be improved over a heat transfer medium containing no nano-particles.

The concentration of nano-particles of a metal or the like dispersed in a liquid fluid can be properly selected as required. For example, when Ni nano-particles are dispersed in liquid sodium, the nano-particles of a concentration as high as up to about 60% by weight can be easily dispersed. By increasing the concentration of nano-particles dispersed in a liquid fluid, the reactivity or toxicity of the liquid fluid can be lowered, or the flow resistance of the liquid fluid can be raised.

TEST EXAMPLE

<Test for Dispersion of Nano-Particles>

In a draft chamber purged with nitrogen, 10 g of metallic sodium was taken in an alumina crucible, and heated to about 350° C. to form liquid sodium. When Ni nano-particles (diameter: about 10 nm; trade name: "Nickel Fine-Powder" manufactured by Sumitomo Electric Industries, Ltd.) were added to the liquid sodium and agitated, up to about 60% by weight of the nano-particles can be easily dispersed in the liquid sodium. When the liquid sodium containing the dispersed nano-particles was cooled to room temperature, and the solidified sample was observed, no aggregation or precipitation of the nano-particles was found, and thus substantially uniform dispersion of the nano-particles in the liquid sodium was confirmed.

On the other hand, when Ni nano-particles were added to the liquid sodium maintained at a relatively low temperature of 100 to 200° C., the nano-particles were not sufficiently dispersed in the liquid sodium because of the surface tension by the oxide layer or hydroxide layer formed on the surfaces of the nano-particles.

This reveals that the oxide layer or hydroxide layer formed on the surfaces of the nano-particles are effectively removed by mixing the nano-particles in liquid sodium under a high-temperature condition, and even though no additives such as a surfactant are added, a high concentration of nano-particles can be dispersed in liquid sodium.

<Test for Lowering Reactivity of Liquid Fluid>

The liquid sodium containing dispersed Ni nano-particles in an amount of 20% by weight prepared in the same manner as described above was solidified to form 0.3 g of a cubic test specimen having a side of about 1 cm. The test specimen was placed on the bottom of a beaker having an inner diameter of 38 mm and a height of 45 mm; 0.06 mL of pure water was dropped from a micropipette onto the test specimen; and the light intensity of the dropped water drops was measured using a displacement meter to confirm the start of the test. The above-described test apparatus was installed in a draft chamber of a nitrogen atmosphere to prevent the progress of the oxidation reaction of sodium. Change in the temperature of the atmospheric gas at 10 mm above the test specimen was measured using a thermocouple, and change in the concentration of the reaction product discharged from the test specimen was measured as the absorption of the laser beam intensity using a visible laser displacement sensor (trade name: "LB-1100" manufactured by Keyence Corporation).

For comparison, change in the temperature of the atmospheric gas and change in the concentration of the reaction product for a test specimen of sodium not containing Ni nano-particles (Ni: 0% by weight) were also measured in the same manner as described above. In order to confirm the reproducibility, these measurements were repeated twice for each of test specimens prepared from different lots.

Figure 2A:
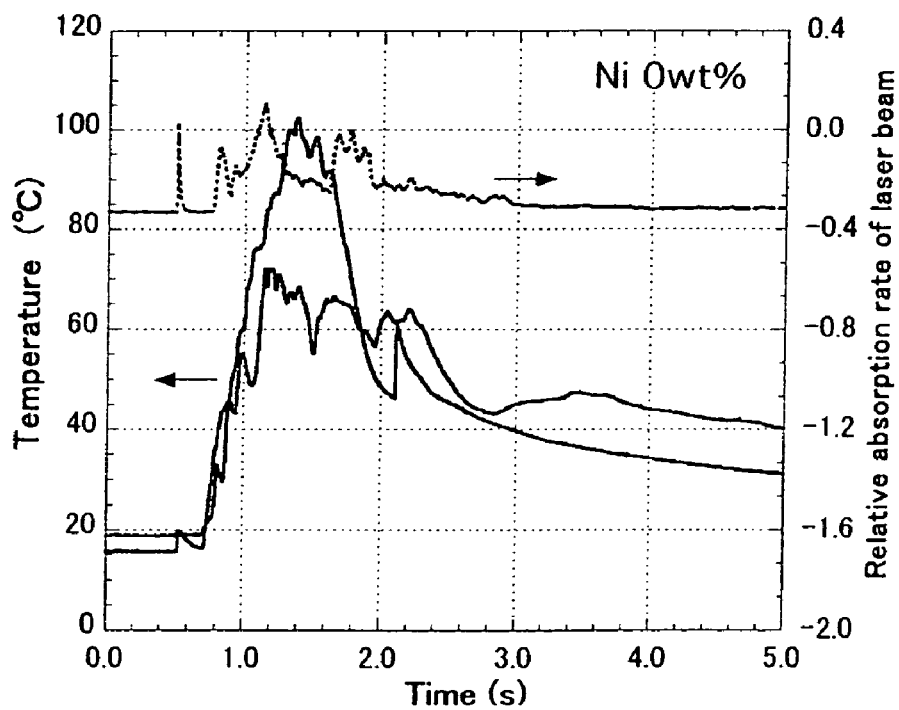
FIG. 2A is a graph showing the test results of the reaction of sodium containing no Ni nano-particles with water.
Figure 2B:
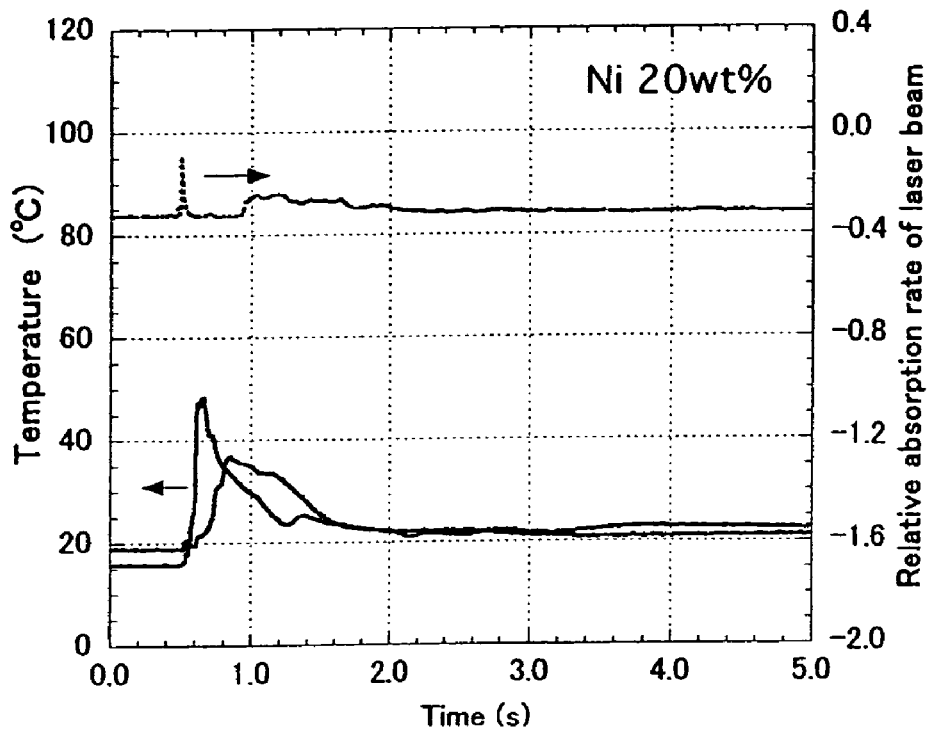
FIG. 2B is a graph showing the test results of the reaction of sodium containing 20% by weight of dispersed Ni nano-particles with water.

Change in temperatures with time and change in the outputs of the displacement sensor (change in the concentration of the reaction product) are shown in FIGS. 2A and 2B, respectively. It is understood from these graphs that the maximum temperature when water was dropped on pure sodium (Ni nano-particles: 0% by weight) (FIG. 2A) was 70 to 102° C., while the maximum temperature when 20% by weight of Ni nano-particles were dispersed in sodium (FIG. 2B) was lowered to 37 to 50° C., and the reaction time was shortened. Therefore, it can be concluded that when about 20% by weight of Ni nano-particles were dispersed, heat generation was obviously less than the case wherein no nano-particles were dispersed, and since the quantity of the reaction product was small, the sodium-water reaction was reduced.

Here, since the reactivity of a limited quantity of a liquid fluid depends on the quantity of the substance to be contained (nano-particles of a metal or the like), when the increase and decrease of the reactivity of a liquid fluid is considered, it is preferred to consider the volume ratio of the substance to be contained. When the weight ratio of 20% by weight of the above-described Ni nano-particles is converted to the volume ratio, it corresponds to 2.65% by volume at a temperature of 20° C. Therefore, the volume ratio of sodium at this time is 97.35% by volume, and the volume ratio of sodium before and after dispersing the nano-particles can be considered not to be significantly different. However, when the results of the test for the reactivity to water as shown in FIG. 2A and FIG. 2B are compared, although the volume ratios of sodium are substantially identical, the ultimate temperature in the case where nano-particles are contained is lowered to about ½ as compared with sodium alone, the reaction time with temperature increase is significantly shortened, and thus the reactivity-reducing effect far larger than the volume ratio occupied by the nano-particles is observed. From these results, it can be estimated that, when sodium contains dispersed Ni nano-particles, the phenomenon wherein sodium atoms are adsorbed on the surface of and in the Ni nano-particles occurs, as conceptually shown in FIG. 1, and the quantity of sodium in the state difficult to react with water is increased.

<Test for Measuring Viscosity of Liquid Fluid>

Twenty grams of sodium was taken in a mixing vessel equipped with motor-driven rotating blades, the mixing vessel was placed in a mantle heater, and heated to 350° C. to liquefy the sodium. Into the liquid sodium, the above-described Ni nano-particles were sequentially added 2 g at a time, and the rotating blades were rotated at a constant rotation speed to disperse the nano-particles in the liquid sodium. Change in the electric current of the motor at this time was measured, and the relationship between the concentration of added nano-particles and the viscosity was obtained from the viscosity-electric current calibration curve previously prepared using a standard solution for calibrating a viscosity meter (manufactured by Showa Shell Sekiyu K. K.).

Figure 3:
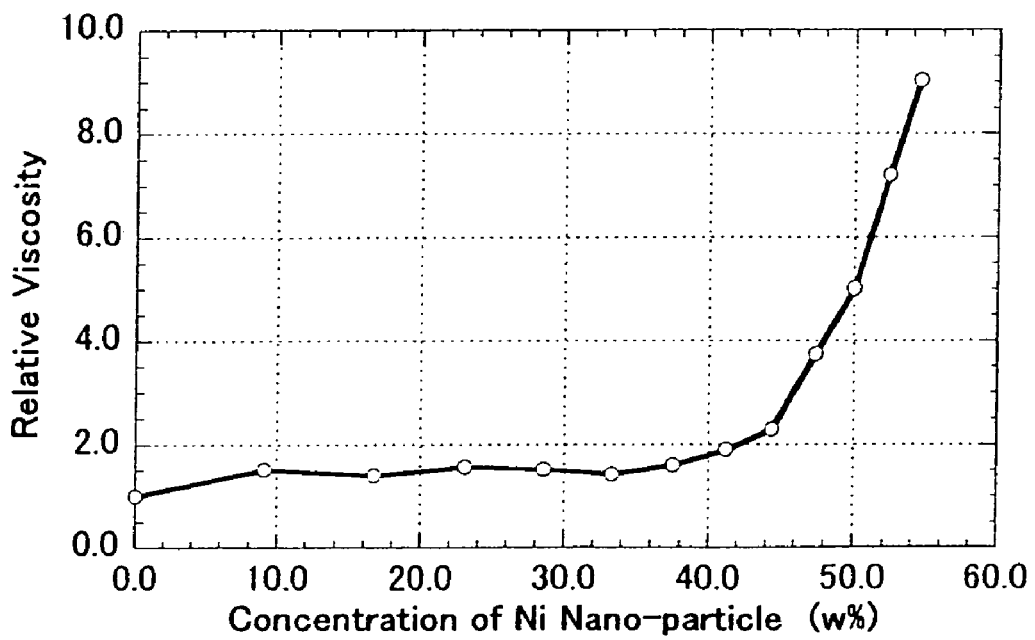
FIG. 3 is a graph showing the relationship between the viscosity of liquid sodium containing Ni nano-particles at 350° C. and the concentration of the nano-particles.

FIG. 3 is a graph showing the viscosity of sodium containing nano-particles as relative values with the viscosity of sodium alone. From FIG. 3, it was known that the viscosity of sodium was substantially constant when the concentration of the nano-particles was up to about 37% by weight, and the value was about 40% larger than the value of sodium containing no nano-particles. However, when the concentration of the nano-particles exceeded 37% by weight, the viscosity increased gradually, and when the concentration was 44% by weight or more, the viscosity increased steeply. When these liquid fluids were visually observed, the fluids were in a slurry state when the concentration of the nano-particles was up to about 44% by weight, and when the concentration of the non-particles was about 44% by weight or more, the fluids were in the state wherein the liquid sodium was absorbed in the nano-particles, or the state wherein no liquid sodium was observed on the surfaces of the nano-particles, and the viscosity was rapidly increased. From these results, it is understood that the flow resistance of a liquid fluid can be raised when nano-particles of a metal or the like are dispersed in the liquid fluid at a predetermined concentration or more.

What is claimed is:

1. A method of reducing reactivity or toxicity in a liquid metal heat transfer medium consisting of the liquid metal itself by dispersing nano-particles selected from the group consisting of metals, alloys and metallic compounds in the liquid metal.

2. The method according to claim 1, wherein the nano-particles are mixed in the liquid metal after removing an oxide layer or a hydroxide layer on the surfaces of the nano-particles.

3. The method according to claim 1, wherein the liquid metal is liquid sodium.

4. The method according to claim 1, wherein the liquid metal is a liquid alkali metal and the nano-particles are dispersed in the liquid alkali metal of a temperature of several hundred degrees Celsius.

5. A method of enhancing flow resistance in a liquid metal heat transfer medium consisting of the liquid metal itself by dispersing nano-particles selected from the group consisting of metals, alloys and metallic compounds in the liquid metal.

6. The method according to claim 5, wherein the nano-particles are mixed in the liquid metal after removing an oxide layer or a hydroxide layer on the surfaces of the nano-particles.

7. The method according to claim 5, wherein the liquid metal is liquid sodium.

8. The method according to claim 5, wherein the liquid metal is a liquid alkali metal and the nano-particles are dispersed in the liquid alkali metal of a temperature of several hundred degrees Celsius.

* * * * *